J. D. CURTIS.
MANURE SPREADER.
APPLICATION FILED MAY 7, 1914.
1,178,137.
Patented Apr. 4, 1916.
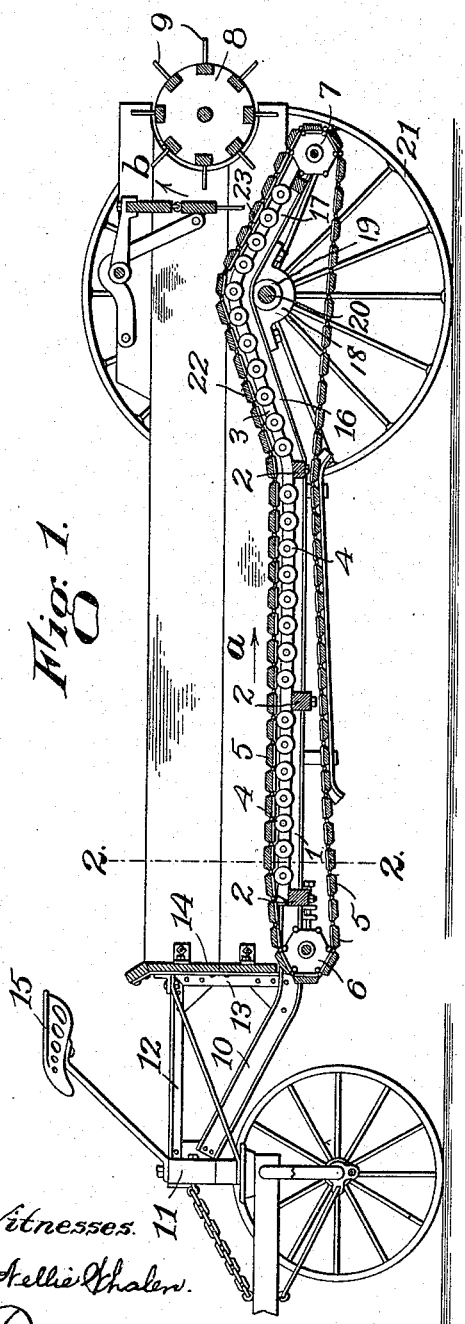
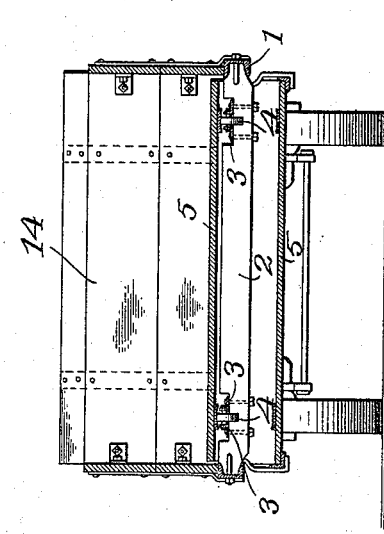
Witnesses.
Nellie Whalen.
Penelope Cumberbach.
Inventor
John D. Curtis.
By Fowler & Kennedy,
Attorneys

UNITED STATES PATENT OFFICE.

JOHN D. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

1,178,137. Specification of Letters Patent. Patented Apr. 4, 1916.

Application filed May 7, 1914. Serial No. 837,055.

*To all whom it may concern:*

Be it known that I, JOHN D. CURTIS, a citizen of the United States, residing at Worcester, in the county of Worcester and Commonwealth of Massachusetts, have invented a new and useful Improvement in Manure-Spreaders, of which the following, taken in connection with the accompanying drawings, is a specification.

The present invention relates to that class of manure spreaders in which a movable bottom is utilized to carry the load toward a beater or other disintegrating device, adapted to distribute the manure over the ground traversed by the spreader. In machines of this type it is desirable to suspend the movable bottom as close to the ground as possible in order to facilitate loading of the manure into the body of the spreader.

An object of the present invention is to provide a construction in which the sills of the body of the spreader, upon which it is customary to support the movable bottom, are supported low enough to provide for convenient loading.

A further object is to provide for a convenient supporting of said sills upon the rear axle of the spreader, which is journaled below said sills, but above the main load supporting section of the movable bottom.

Other and further objects will appear from the following description taken in connection with the accompanying drawings, in which—

Figure 1 is a longitudinal vertical sectional view of a manure spreader embodying my invention. Fig. 2 is a section on line 2—2, Fig. 1.

Similar reference characters refer to similar parts in the different figures.

The numerals 1, 1, denote the sills upon which the body of the spreaders is supported. Between the sills 1, 1, are cross bars 2, which support the longitudinal angle bars 3, 3, between which the rolls 4, 4, are journaled. Upon the rolls 4 is supported the movable bottom, which in the present instance is endless and consists of transversely extending slats 5, hinged at their edges. The movable bottom is carried at each end of the spreader upon sprocket wheels 6 and 7, to one of which a slow rotary motion is imparted, by a mechanism, not shown, which moves the upper part of the bottom, upon which the load is supported, in the direction of the arrow *a*, Fig. 1. The beater 8 is journaled at the rear end of the spreader, above the sprocket wheel 7, and a rapid rotation is imparted to the beater by a mechanism, not shown, which carries the beater teeth 9 in a circular path, in the direction of the arrow *b*. At the front end of the spreader the sills 1 are bent upwardly, as shown at 10, Fig. 1, with their forward ends connected by a cross bar 11 of the same width as the body of the spreader. An angular framework 12 is mounted upon the upturned portion of the sills having its vertical member 13 supporting the headboard 14. Mounted upon the cross bar 11 is the driver's seat 15. Each sill 1 is bent upwardly from a point in front of the rear axle of the spreader, and then downwardly, the rear extremities of said sills being disposed beneath the beater 8. An upwardly inclined section 16 and a downwardly inclined section 17 of each sill are thereby formed, and at the meeting points of said sections suitably shaped straps 18 are hung, from the under surfaces of said sills for the support of sleeves 19, in which the ends of the rear axle 20 are journaled. Upon the ends of said rear axle the rear wheels of the spreader are journaled, one of which is shown at 21, Fig. 1, having a pawl and ratchet connection with said axle, as is usual in manure spreaders, causing the rotation of the wheels 21 to rotate said axle, which is utilized as the driving means for the beater 8 and the rear sprocket wheel 7, by connecting mechanism common to manure spreaders, but not herein shown or described, since it forms no part of the present invention. The longitudinal angle bars 3 which form the track for the movable bottom follow the bends in the sills 1, causing said movable bottom to assume the upward inclination as indicated at 22, in front of the rear axle, to carry it over said axle, and a downward inclination, as indicated at 23, at the rear of said axle.

By the above described construction, the main load supporting section of the movable bottom is maintained low enough to permit of convenient loading of manure to the spreader, the portion of the sills supporting the same being disposed below the plane of the rear axle. Nevertheless, by reason of the shape of said sills, the body of the spreader is supported upon the rear axle, rather than suspended from it, thereby securing all the advantages of an underslung construction without using such a construction. Furthermore, the disadvantages incident to an underslung spreader are eliminated by carrying the movable bottom over the rear axle, whereby the progress of the load toward the beater mechanism is unobstructed.

It will be obvious that the movable bottom might be supported upon rolls carried directly by the sills themselves, thereby producing the upwardly and downwardly inclined sections 16 and 17 of the movable bottom. By the employment of the longitudinal bars 3, 3, however, the rows of supporting rolls 4 may be brought closer together obviating the necessity of a central row of rolls.

I claim,

1. In a manure spreader, a rear axle, a pair of sills supported above said axle, a track for a movable bottom supported throughout its length upon said sills, said sills being bent upwardly and downwardly to carry said track over said rear axle, and a movable bottom supported on said track.

2. In a manure spreader, a rear axle, a pair of longitudinal sills having portions thereof overlying said rear axle and disposed throughout the major portion of their lengths below the axis of said axle, and a bottom supported by said sills and movable in a path defined by the upper surfaces thereof.

Dated this fifth day of May 1914.

JOHN D. CURTIS.

Witnesses:
  NELLIE WHALEN,
  PENELOPE COMBERBACH.

Copies of this patent may be obtained for five cents each, by addressing the "Commissioner of Patents, Washington, D. C."